US009272802B2

(12) United States Patent
Hull

(10) Patent No.: US 9,272,802 B2
(45) Date of Patent: *Mar. 1, 2016

(54) STEPPED SONOTRODE AND ANVIL ENERGY DIRECTOR GRIDS FOR NARROW/COMPLEX ULTRASONIC WELDS OF IMPROVED DURABILITY

(71) Applicant: Gordon Hull, Newtown, CT (US)

(72) Inventor: Gordon Hull, Newtown, CT (US)

(73) Assignee: Rinco Ultrasonics USA, Inc., Dan Bury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,620

(22) Filed: Sep. 23, 2014

(65) Prior Publication Data
US 2015/0090405 A1    Apr. 2, 2015

Related U.S. Application Data

(63) Continuation-in-part of application No. 13/736,199, filed on Jan. 8, 2013, now abandoned, which is a continuation of application No. 12/925,652, filed on Oct. 26, 2010, now Pat. No. 8,376,016.

(60) Provisional application No. 61/883,595, filed on Sep. 27, 2013.

(51) Int. Cl.
*B32B 37/00*    (2006.01)
*B65B 51/22*    (2006.01)
(Continued)

(52) U.S. Cl.
CPC ............... *B65B 51/225* (2013.01); *B29C 65/08* (2013.01); *B29C 66/1122* (2013.01);
(Continued)

(58) Field of Classification Search
CPC ............. B29C 65/08; B29C 66/8322; B29C 66/81427; B29C 66/81433; B29C 66/8141; B29C 66/0222; B29C 66/43
USPC ............... 156/73.1, 580.1, 580.2, 581, 583.1
See application file for complete search history.

(56) References Cited

U.S. PATENT DOCUMENTS 8,376,016 B2 *    2/2013  Hull ........................... 156/580.2
8,591,679 B1 *   11/2013  Hull ............................. 156/73.1
(Continued)

FOREIGN PATENT DOCUMENTS

| EP | 0242480 A2 | 10/1987 |
| EP | 0 967 161 A1 | 12/1999 |
| EP | 1258557 A2 | 8/2001 |
| EP | 1407681 A2 | 10/2002 |

(Continued)

*Primary Examiner* — James Sells
(74) *Attorney, Agent, or Firm* — Thomas A. O'Rourke; Bodner & O'Rourke LLP

(57) ABSTRACT

A sonotrode and anvil are adapted for ultrasonic welding of work pieces, to produce a narrower weld region that exhibits greater durability, permitting use of less material per package. The horn-to-anvil contact is through a plurality of energy directors arranged into a three-dimensional grid pattern to be capable of distributed vibration-transmissive contact. The energy directors include a series of plateau surfaces regularly spaced apart in a first direction, and in a second direction that is orthogonal to the first direction, to form the grid pattern. The energy directors of the horn are configured to interlock with the energy directors of the anvil. The rectangular-shaped plateaus are spaced apart by angled side-surfaces that form valleys. A stepped transition to a corresponding region of reduced height for the energy directors of the sonotrode and anvil may form a cosmetic seal region with a lesser integrity, in addition to the main barrier seal.

22 Claims, 16 Drawing Sheets

(51) Int. Cl.
  *B29C 65/08* (2006.01)
  *B29C 65/00* (2006.01)
  *B29L 31/00* (2006.01)
  *B29C 65/74* (2006.01)

(52) U.S. Cl.
  CPC .............. *B29C 66/244* (2013.01); *B29C 66/43* (2013.01); *B29C 66/8167* (2013.01); *B29C 66/81427* (2013.01); *B29C 66/81431* (2013.01); *B29C 66/81433* (2013.01); *B29C 66/81435* (2013.01); *B29C 66/8322* (2013.01); *B29C 66/83221* (2013.01); *B29C 66/847* (2013.01); *B29C 65/7451* (2013.01); *B29C 66/3022* (2013.01); *B29C 66/8242* (2013.01); *B29C 66/849* (2013.01); *B29C 66/9513* (2013.01); *B29C 66/9517* (2013.01); *B29L 2031/712* (2013.01)

(56) References Cited

U.S. PATENT DOCUMENTS

| | | | |
|---|---|---|---|
| 8,689,850 B2 * | 4/2014 | Hull | 156/580.2 |
| 2014/0190638 A1 * | 7/2014 | Hull | 156/580.2 |
| 2014/0283998 A1 * | 9/2014 | Hull | 156/580.2 |
| 2014/0338842 A1 * | 11/2014 | Hull | 156/580.2 |
| 2015/0090405 A1 * | 4/2015 | Hull | 156/580.2 |
| 2015/0107780 A1 * | 4/2015 | Hull | 156/580.1 |
| 2015/0107781 A1 * | 4/2015 | Hull | 156/580.1 |

FOREIGN PATENT DOCUMENTS

| | | |
|---|---|---|
| EP | 2 447 042 A2 | 5/2012 |
| FR | 2440241 | 5/1980 |
| GB | 1 216 743 | 12/1970 |
| JP | H04 1028 A | 1/1992 |
| JP | H07 10130 A | 1/1995 |
| WO | WO 03 009922 A1 | 2/2003 |

\* cited by examiner

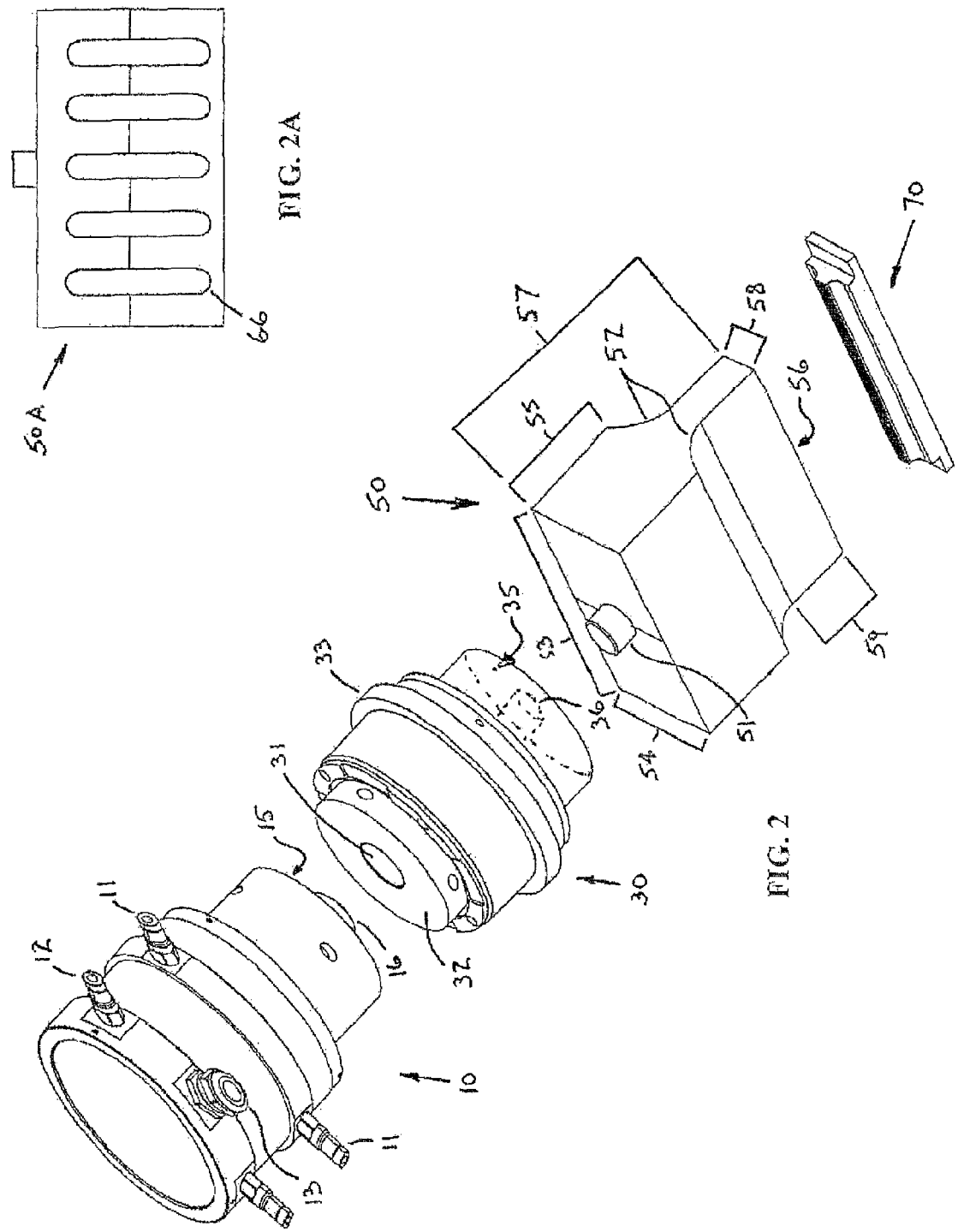

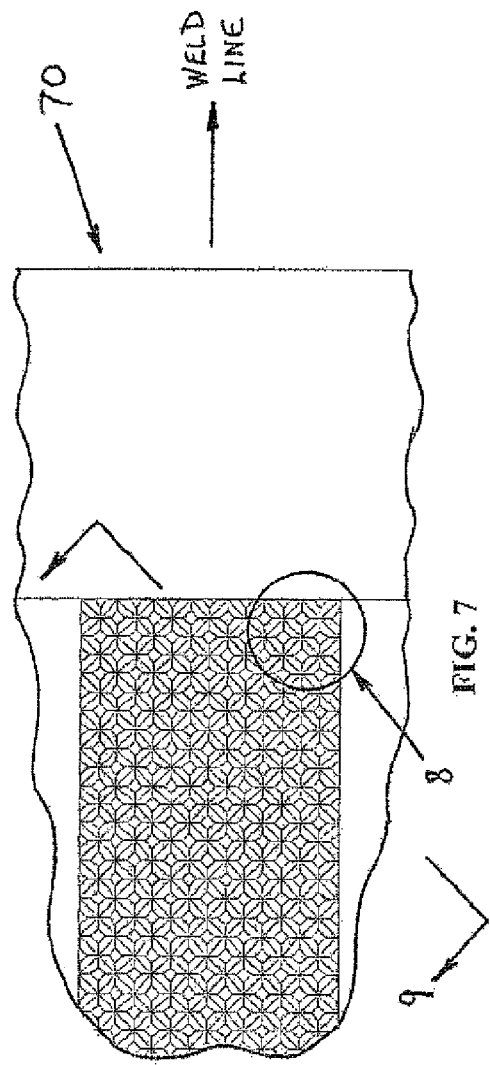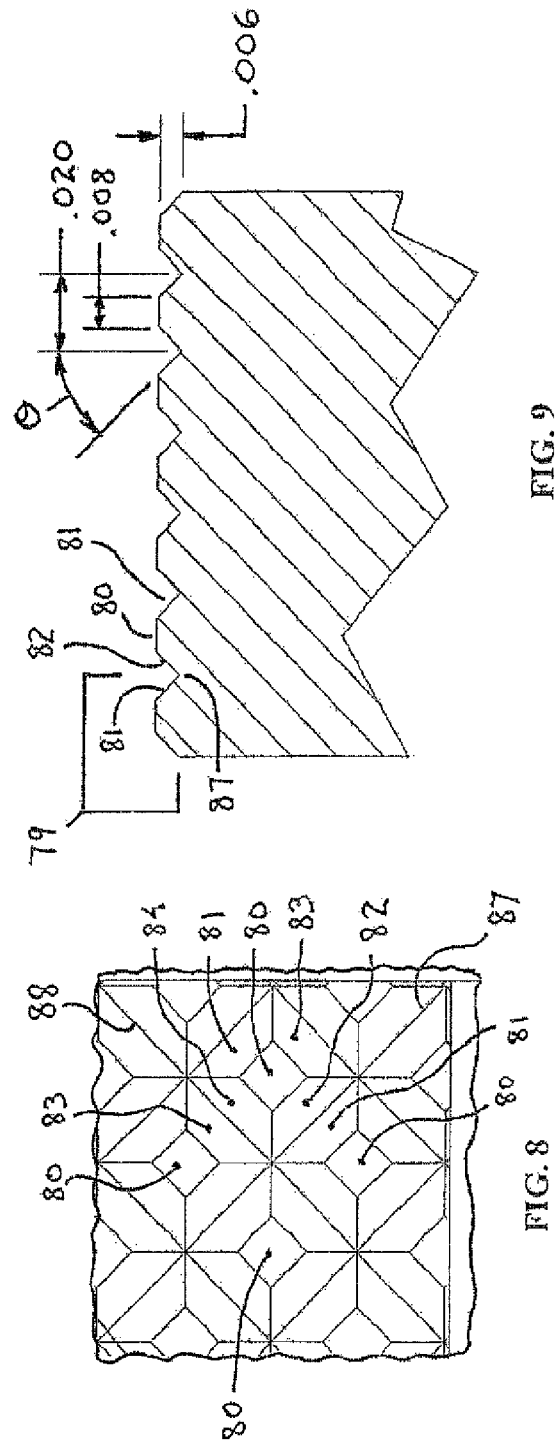

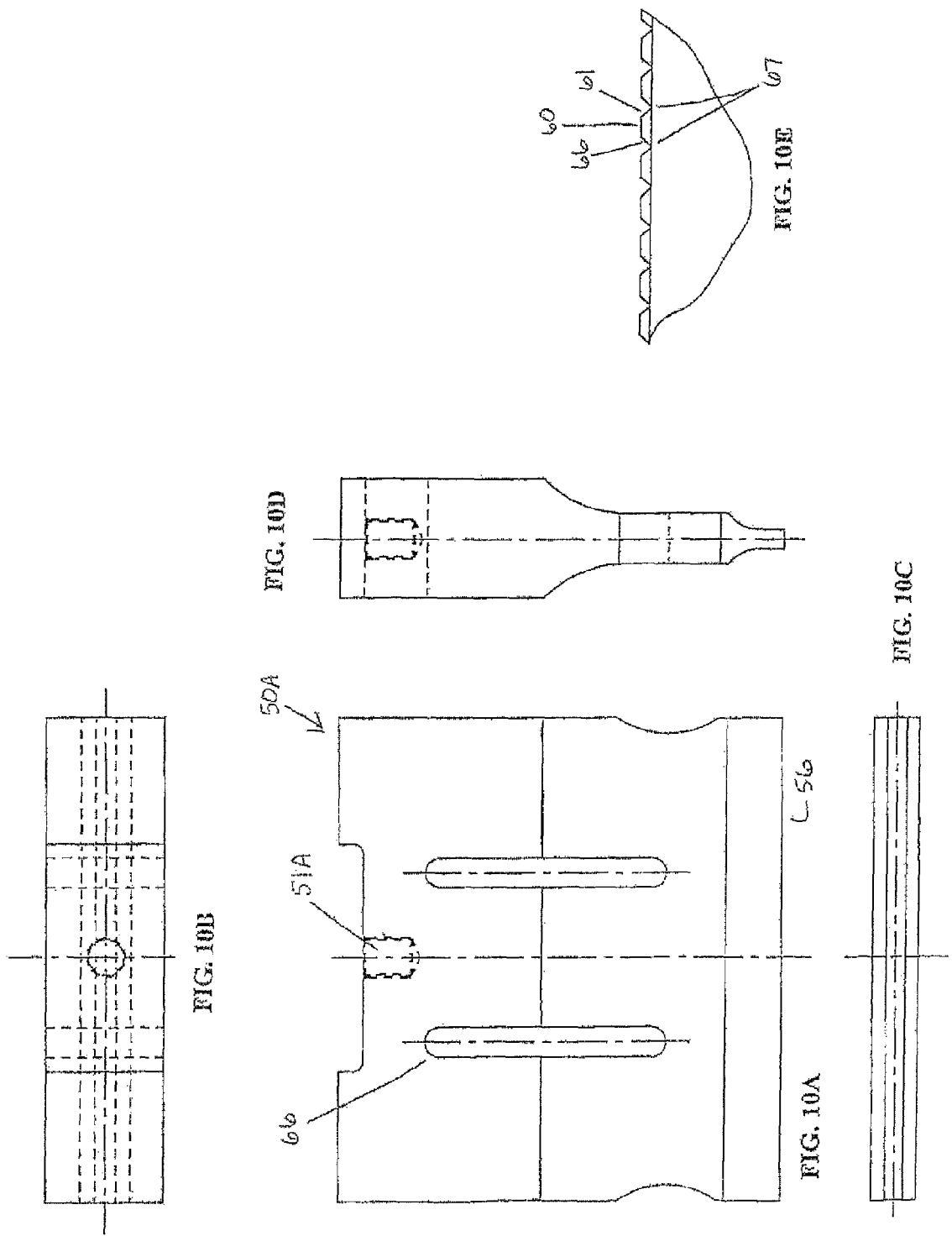

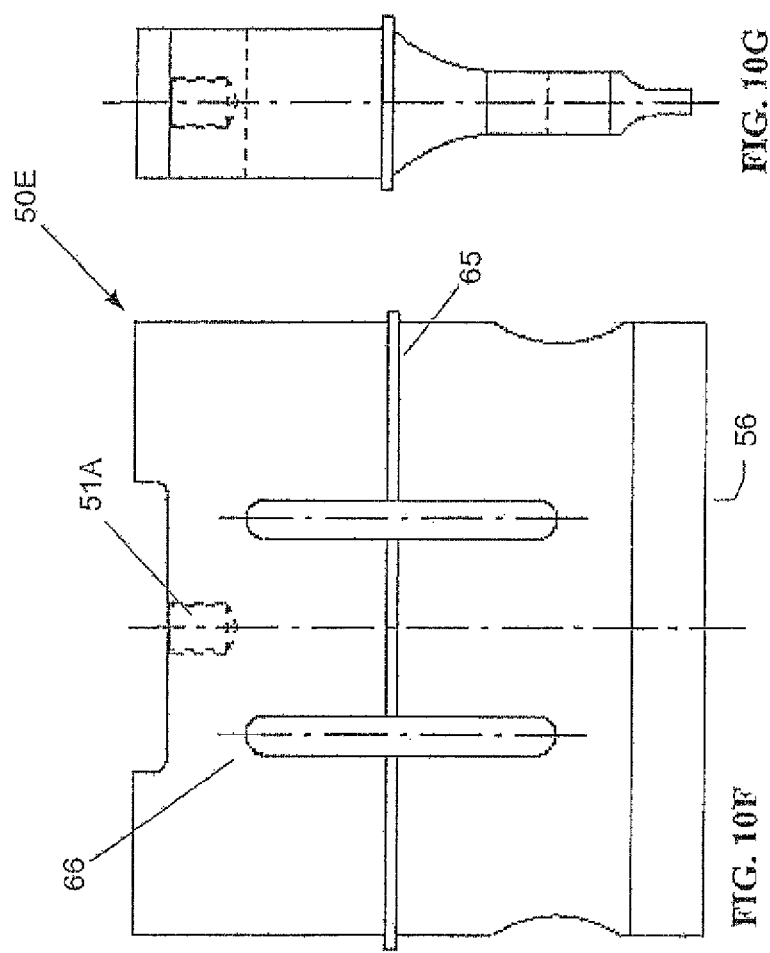

(Butt Surface Alignment)

(Interlocking Alignment)

STEPPED SONOTRODE AND ANVIL ENERGY DIRECTOR GRIDS FOR NARROW/COMPLEX ULTRASONIC WELDS OF IMPROVED DURABILITY

CROSS REFERENCES TO RELATED APPLICATIONS

This application claims priority on U.S. Provisional Application Ser. No. 61/883,595, filed on Sep. 27, 2013, and is a continuation-in-part of U.S. application Ser. No. 13/736,199, filed Jan. 8, 2013, which is a continuation of U.S. application Ser. No. 12/925,652, filed Oct. 26, 2010, now issued as U.S. Pat. No. 8,376,016, with the disclosures of each incorporated herein by reference in their entirety. This application also incorporates by reference the disclosures of U.S. patent application Ser. No. 13/713,237, now issued as U.S. Pat. No. 8,591,679, and U.S. patent application Ser. No. 13/751,363, now issued as U.S. Pat. No. 8,689,850.

FIELD OF THE INVENTION

The present invention relates to improvements in sonic welding techniques and equipment, and more particularly to apparatus which are capable of sonic welding of films in which the weld areas are narrower for more efficient use of material, but are also more durable.

BACKGROUND OF THE INVENTION

There are many products sold today—in supermarkets, mini-marts, vending machines, and in other non-food related retail locations—that require the use of packaging, other than a cardboard box, where the packaging may preferably be flexible and be sealed to be air-tight or liquid-tight. Such packaging is commonly made of a plastic film. Today, such films may typically be made from one or more of the following materials: polyethylene (PA); low, medium or high density polypropylene (LLDPE, LDPE, MDPE, or HDPE); polypropylene (PP), cast polypropylene (CPP), and oriented polypropylene (OPP); polyamide (PA); polyester (linear ester plastics); a polyethylene (PE) such as polyethylene terephthalate (PET); Polyvinylchloride (PVC); polyvinylidene chloride (PVDC); cellulose acetate (CA); cellophane; and aluminum (Al).

Machines for taking rolls of these films and shaping/creating a package, filling it with a pre-set amount of product, sealing the package, and separating successive packages in a continuous process are known in the art as form and fill packaging machines. There are generally two types—a vertical form-fill-sealing (VFFS) machine and a horizontal form-fill-sealing (HFFS) machine.

In the past, many of those thermoplastic materials (or thermo-softening plastics) had been joined to create a package by sealing through the direct application of heat to fuse adjoining sheets, typically in a lap or fin joint. An improvement was made in the sealing process by the introduction of ultrasonic welding techniques, which can be faster, and do not have some of the disadvantages of heat sealing, such as the potential for damage to the packaging material or product due to an excessive application of heat.

Ultrasonic welding techniques comprise the joining of similar or dissimilar material(s) by passing the material(s) between an anvil and a sonotrode, which is often referred to as a horn. The sonotrode may generally be connected to either a magnetostrictive transducer or a piezoelectric transducer. A magnetostrictive transducer uses electrical power to generate an electro-magnetic field that may cause the magnetostrictive material to vibrate. With a piezoelectric transducer, the supplied electrical power is directly converted, and more efficiently converted, into longitudinal vibrations. Use of the piezoelectric transducer reduces the cooling requirements, which result from the generation of the heat, which is a byproduct of the friction. The frequencies used in ultrasonic welding are typically in the range of 15 kHz to 70 kHz, and use of such frequencies causes local melting of the thermoplastic material due to absorption of heat generated from the vibration energy.

One of the earlier U.S. patents granted for ultrasonic welding was U.S. Pat. No. 2,946,119 to Jones for "Method and Apparatus Employing Vibratory Energy for bonding Metals," while an early example of a machine utilizing ultrasonic welding principles is shown by U.S. Pat. No. 3,224,915 to Balamuth for "Method of Joining Thermoplastic Sheet Material by Ultrasonic Vibrations." Balamuth cites improvement over the prior art, by inclusion of a rotary vibrator, which emits radial vibrations that are operative to join thermoplastic sheet materials being continuously advanced past the device. However, Balamuth does not disclose a complete VFFS or HFFS machine.

U.S. Pat. No. 4,288,965 to James does disclose a "Form-Fill-Seal Packaging Method and Apparatus," in the form of a VFFS machine, The James VFFS machine pulls material from a roll, into a vertical tube for longitudinal seam sealing and product delivery, but advantageously requires a reduced amount of pull needed to form the package, thereby reducing tension in the material, along with its resultant degradation. The James VFFS machine represents an improvement over then expired U.S. Pat. No. 2,899,875 to Leasure titled "Apparatus for Packaging," which had used a heated shoe to activate a heat sealing compound in order to create a tubular package. The James VFFS machine also enabled a relatively high rate of production of packages. Transverse sealing to create a top seal for a completed package and a bottom seal for a next package was accomplished using a pair of sealing bars operable in a horizontal plane, which may include an integral cutting means.

U.S. Pat. No. 4,517,790 to Kreager for "Apparatus and Method for Ultrasonic Sealing of Packages" provides improvements over prior art form-fill-seal machines which had generally featured intermittent motion in the discrete process steps of forming and filling, and then sealing. Kreager permitted transverse end sealing "on the fly," meaning continuously. The Kreager machine "utilizes a rotary back-up anvil and a simulated rotary motion ultrasonic sealing horn in synchronism with one another," to "provide an appropriate end seal for each package while on the move."

There has been a long felt but unmet need, as to form-fill-seal machines, with respect to efficiency in the use of the film materials to create each package. When a consumer purchases a bag of chips or other product, a significant percentage of the cost of the purchase is attributable to the packaging. The major factors in determining the costs of the packaging are materials and labor. One of the ways to reduce the materials required for the package is to use a narrower ultrasonic weld to seal the package, and conserve the excess. There have been several inventions in related art, but they only peripherally address the issue.

U.S. Pat. No. 4,029,538 to Vance, Jr. for "Ultrasonic Film Splicer" stated that "The method of the instant invention comprises . . . binding said film strips together by applying oscillatory energy to the overlapped edges of the film strips by confining them between transducer means comprising a narrow elongated horn member . . . " Similarly, U.S. Pat. No.

4,161,420 to Clarke for "Ultrasonic Method for Manufacturing Brassiere Tapes" taught having an anvil with a knife edge and beveled sections to "provide a comparatively narrow path responsive to the ultrasonic energy applied to the horn." However, both of these inventions merely teach using a "narrow" anvil/horn combination to produce a narrow width of welded material, but offer nothing toward maintaining the integrity of the seal, which is crucially important for preserving product freshness, and when seeking to securely package liquids. The invention disclosed herein provides a means of producing a narrower weld to reduce the material costs of packaging, while simultaneously achieving weld integrity matching or exceeding that of the standard ultrasonic welding of existing form-fill-seal machines.

OBJECTS OF THE INVENTION

It is an object of the invention to provide an improved method for accomplishing packaging using a form-fill-seal machine which is more economical.

It is another object of the invention to provide improvements to a form-fill-seal machine which reduces material costs of each package.

It is a further object of the invention to provide a means of improving the ultrasonic welding equipment of form-fill-seal machines to reduce material usage per package.

It is another object of the invention to provide an ultrasonic weld that is narrower, through the use of a specially designed sonotrode-anvil combination.

It is also an object of the invention to provide a narrow ultrasonic weld having the integrity of a traditionally wider sonic weld.

It is another object of the invention to provide a narrower ultrasonic weld of greater durability through a sonotrode-anvil combination that causes minor elastic deformation to the work piece prior to welding.

Further objects and advantages of the invention will become apparent from the following description and claims, and from the accompanying drawings.

SUMMARY OF THE INVENTION

A specially designed sonotrode and anvil are adapted to be used in combination for ultrasonic welding of work pieces, to produce a narrower weld region, but one exhibiting greater durability, thereby permitting use of less packaging material. The contact surfaces comprise a surface of the anvil having a plurality of energy directors, where the plurality of energy directors are arranged into a three-dimensional grid pattern to selectively distribute vibration-transmissive contact into a three-dimensional contact pattern with the sonotrode. The energy directors, which may serve to increase the total surface area of contact between anvil and sonotrode, may comprise a series of plateau surfaces being regularly spaced apart from each other in a first direction, and in a second direction that is preferably orthogonal to the first direction, to form the grid pattern. The plateau surfaces may each be rectangular-shapes that are oriented at a 45 degree to the weld line, and may have each of the four sides transitioning into an angled side surface, such that the angled side surfaces of adjacent plateaus connect at a trough, and serve to separate the plateau surfaces.

Engagement of the energy directors of the anvil with the corresponding surface of the sonotrode may cause minor elastic deformation of work pieces positioned therebetween prior to ultrasonic welding, due to the plateau/valley grid pattern on the anvil and corresponding pattern on the sonotrode.

BRIEF DESCRIPTION OF THE DRAWINGS

FIG. 2 is an exploded view of a converter, a booster, a sonotrode, and the waffle-grid anvil used to weld straight patterns in one embodiment of the present invention.

FIG. 2A is a side view of one embodiment of a horn containing a series of slotted openings.

FIG. 7 is an enlarged detail view of anvil of FIG. 4.

FIG. 8 is an enlarged detail view of the grid surface of the anvil of FIG. 7.

FIG. 9 is a section cut through the anvil of FIG. 7, and is shown rotated 45 degrees clockwise.

FIG. 10A is a front view of an alternate embodiment of the horn of the present invention.

FIG. 10B is a top view of the alternate embodiment of the horn of FIG. 10A.

FIG. 10C is a bottom view of the alternate embodiment of the horn of FIG. 10A.

FIG. 10D is a side view of the alternate embodiment of the horn of FIG. 10A.

FIG. 10E is a section cut through the energy directors of the horn of FIG. 10A.

FIG. 10F is a front view of a second alternate embodiment of the horn of the present invention.

FIG. 10G is a side view of the alternate horn embodiment of FIG. 10F.

DETAILED DESCRIPTION OF THE INVENTION

Figure 1B:
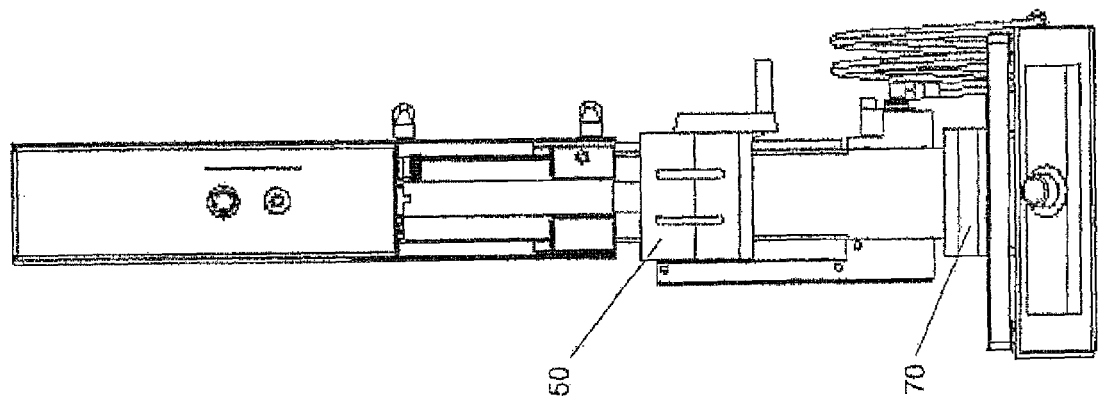
FIG. 1B is a front view of the ultrasonic welding machine of FIG. 1A.

Ultrasonic welding is a process in which one or more pieces of material, very often being plastic material, may be fused together without adhesives, mechanical fasteners, or the direct application of heat (which tends to distort larger areas that need to be welded), by instead subjecting the materials to high frequency, low amplitude vibrations. The material to be welded may have an area where the material or materials are lapped to form a seam that is sandwiched between what is typically a fixed or moveable anvil and a fixed or moveable sonotrode.

As stated in the background, ultrasonic welding may be utilized for fusing metal parts, however, it is commonly used for the joining of plastic work pieces. The word "plastic" can refer, in the mechanical arts, to the stress/strain relationship where strain has exceeded a material-specific point at which further deformation results in a permanent change in shape, which is distinguishable from the technical description of the material "plastic." Plastic material usually comprises polymers with a high molecular mass, and can be combined with other components to enhance the performance of the material for specific applications.

Plastic materials fall into one of two categories—thermoplastic (or thermo-softening plastic) and thermosetting. A thermosetting polymer can be melted once only to take a certain shape, after which it cures irreversibly. Conversely, thermoplastics may be repeatedly softened or even melted upon application of sufficient heat. Thermoplastic materials may be further subdivided, based upon the structure of the polymer molecule, which determines its melting and welding characteristics, into amorphous and semi-crystalline thermoplastics. Some examples of amorphous thermoplastics are: acrylonitrile butadiene styrene (ABS), acrylic, polyvinylchloride (PVC), and polycarbonate (or Lexan™). Some examples of semi-crystalline thermoplastic materials include: polyethylene plastic resin (PE), polypropylene (PP), polyamide (PA), and polyester (linear ester plastics). The amorphous thermoplastic materials possess a randomly ordered molecular structure that is without a distinctive melting point, and therefore soften gradually to become rubbery before liquefying, and also solidify gradually, with less of a tendency to warp or experience mold shrinkage. Conversely, semi-crystalline thermoplastics have a discrete melting point, and require a high level of heat energy to break down the crystalline structure, at which melting occurs. The semi-crystalline thermoplastic materials, unlike amorphous polymers, remain solid until reaching its discrete melting temperature, after which they melt quickly, and also solidify quickly.

Ultrasonic welding may be performed for similar materials, and sometimes even dissimilar materials, but to form a molecular bond for dissimilar materials generally requires chemical compatibility, meaning that the melt temperatures are roughly within 40 degrees Celsius and have similar molecular structure. Ultrasonic welding consists of mechanical vibrations causing friction between work piece materials that generates heat to melt the contact area therebetween, which results in the formation, upon cooling, of a homogenous molecular bond. The process requires a controlled amount of pressure to permit the vibrations to cause the friction heating, with that pressure being applied between the sonotrode and the anvil, which is the focal point of the current invention.

The anvil may be secured to an appropriate fixture, while the sonotrode (otherwise known as a "horn" within the relevant art) comprises part of the critical array of equipment in ultrasonic welding machines known as the "stack." The stack consists of a converter (also known as a transducer, but that term sometimes may also imply use as a sensor/detector), an optional booster, and the sonotrode. A converter is a device that converts one type of energy into another type of energy. Generally, the converter in the stack will either be a magnetostrictive transducer or a piezoelectric transducer. A magnetostrictive transducer uses electrical power to generate an electro-magnetic field that may cause the magnetostrictive material to vibrate. With a piezoelectric transducer, which is commonly used today, the supplied electrical power is directly converted, and more efficiently converted, into longitudinal vibrations. A piezoelectric transducer consists of a number of piezoelectric ceramic discs that may be sandwiched between two metal blocks, termed front driver and back driver. Between each of the discs there is a thin metal plate, which forms the electrode. A sinusoidal electrical signal—typically 50 or 60 Hertz AC line current at 120-240 volts—is supplied to the generator or power supply. The generator or power supply then delivers a high voltage signal generally between 15,000 and 70000 hertz to the converter or transducer. The ceramic discs will expand and contract, producing an axial, peak-to-peak vibratory movement of generally between 12 to 25 µm, and usually being at a frequency of either 20,000 Hertz or 35,000 Hertz, but with an often used frequency range of 15 kHz to 70 kHz. So, the transducer converts high frequency electrical energy to high frequency mechanical motion.

The booster, being used as a mounting point for the stack, is also utilized to suitably alter the amplitude of the vibrations created by the transducer prior to being transmitted to the horn. The booster may either decrease or increase the amplitude of the vibrations, with such changes being known in ratio form as the "gain." A one to three (1:3.0) booster triples the amplitude of the vibrations produced by the transducer, while a one to 0.5 (1:0.5) booster decreases the vibration amplitude by one-half. Boosters may be substituted in a stack to alter the gain in order to be suitable for a particular operation, as differences in the gain may be needed for different material types, and the type of work that is to be performed.

The horn is the specially designed part of the stack that supplies the mechanical energy to the work pieces. It is typically made of aluminum, steel, or titanium. Aluminum tends to be used most often for low volume applications, as aluminum horns wear more quickly than ones made of titanium or steel, although some horns may be manufactured with a special hardened tip to resist local wear. Aluminum horns are also sometimes used when more rapid heat dissipation is needed. Additionally, multi-element composite horns may be used to weld parts.

The length of the horn is a key aspect of its design. To ensure that the maximum vibration amplitude in the horn is in the longitudinal direction (away from the booster and toward the work pieces and anvil), the horn may contain a series of slotted openings 66 (see FIG. 2A). Also, the horn, like the booster, is a tuned component. Therefore, the wavelength of the vibrations and the length of the horn must be coordinated. In general, the length must be set to be close to an integer multiple of one-half of the wavelength being propagated through the material of the horn. Therefore the horn may be sized to be a half wavelength, a full wavelength, or multiple wavelengths in length. This arrangement ensures that sufficient amplitude will be delivered at the tip to cause adequate vibrations, in the form of expansion and contraction of the horn at its tip, to create the frictional heating necessary for melting of the work pieces. This amplitude, for most horns, will typically be in the range of 30-120 μm.

All three elements of the stack—converter, booster, and sonotrode—are tuned to resonate at the same frequency, being the aforementioned ultrasonic frequencies. These rapid and low-amplitude frequencies, which are above the audible range, may be applied in a small welding zone to cause local melting of the thermoplastic material, due to absorption of the vibration energy. The application of ultrasonic vibrations may be for a predetermined amount of time, which is known as the weld time, or energy, which is known as the weld energy. Typically, the welding process generally requires less than one second, for fusing of the portion of the two parts on the joining line where the sonic energy is applied. To achieve adequate transmission of the vibrations from the horn through the work pieces, pressure is applied thereto by an anvil supported in a fixture, and through the use of a press.

Figure 1A:
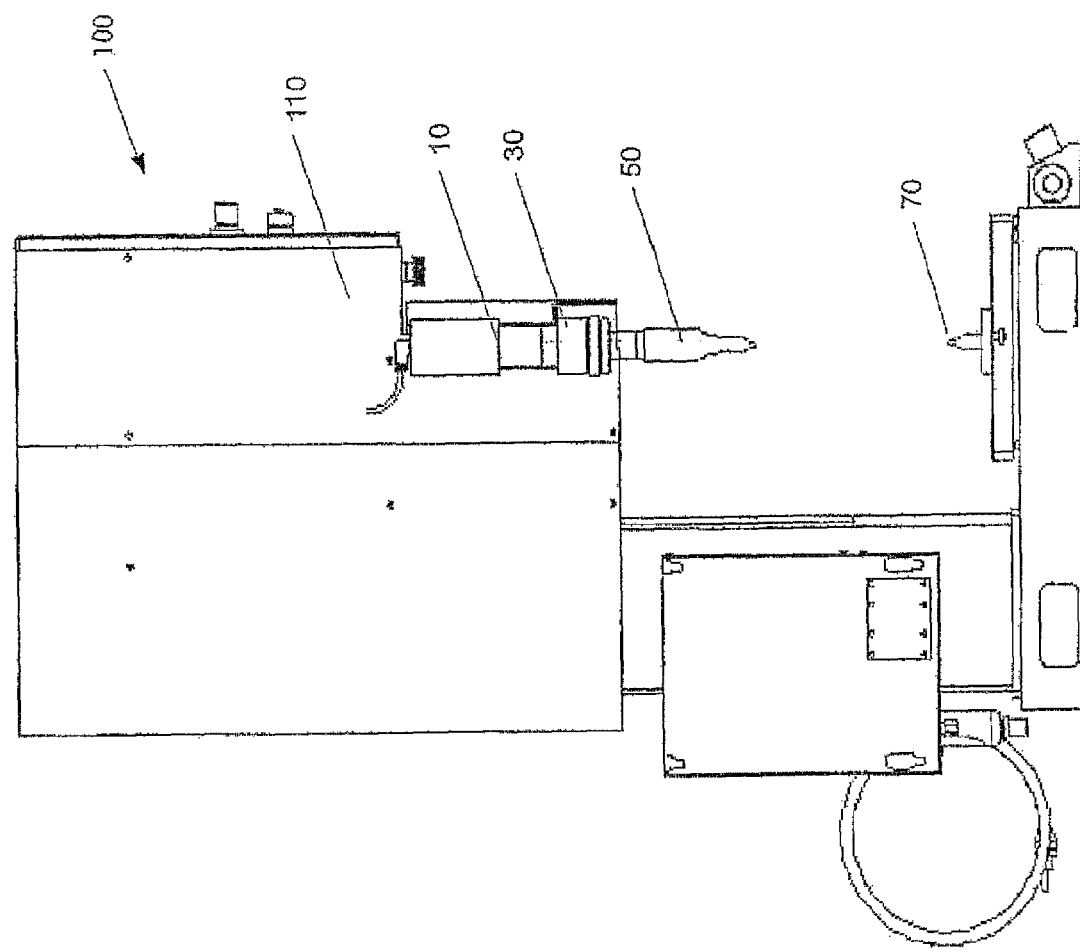
FIG. 1A is a side view of an ultrasonic welding machine, utilizing the arrangement of a converter with a booster, and a sonotrode/anvil of the present invention.
Figure 3:
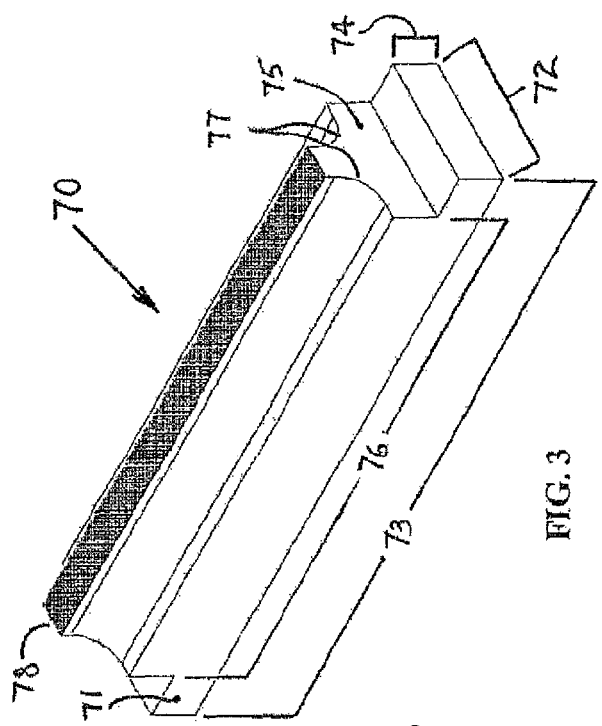
FIG. 3 is an isometric view of the waffle-grid anvil of the present invention.
Figure 4:
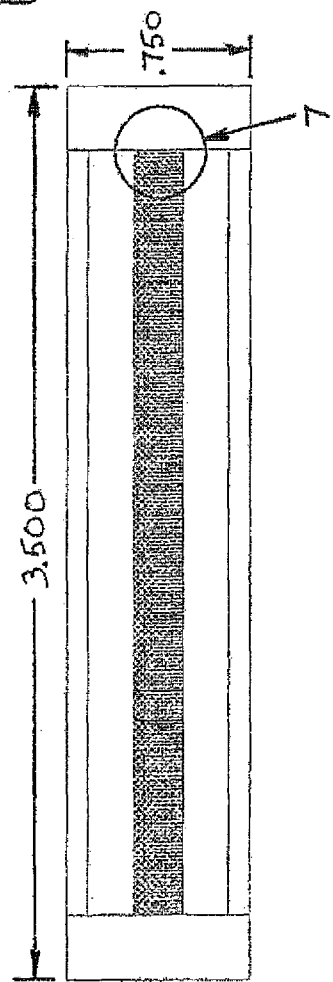
FIG. 4 is a top view of the anvil of FIG. 3.
Figure 6:
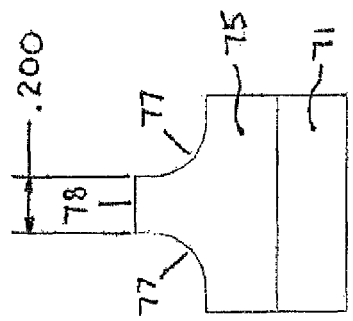
FIG. 6 is an end view of the anvil of FIG. 3.
Figure 5:
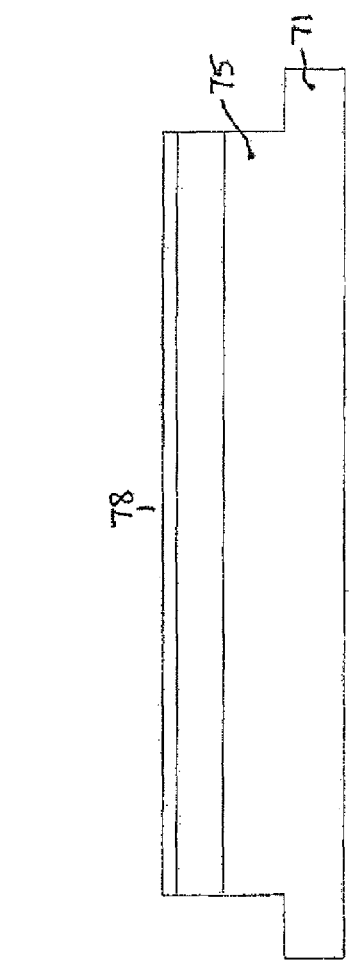
FIG. 5 is a side view of the anvil of FIG. 3.

FIGS. 1A and 1B show an ultrasonic welding machine 100 utilizing the arrangement of a converter, a booster, press, and a sonotrode/anvil of the current invention. The booster 30 is often the means by which the stack is secured to the press 110, with it usually being secured to a flange or some other portion of the press 110. The converter 10 may be attached to one side of the booster 30, while the sonotrode (horn) 50 may be attached to the other side of the converter to be in proximity to the anvil 70. The material(s) that are to be fused together may be located upon anvil 70. A pneumatic system within the press 110 may cause the flange mounted stack to be translated downward so as to contact and apply pressure through the material(s) against anvil 70, during which time ultrasonic vibrations are emitted by the converter and resonate through the booster and sonotrode.

FIG. 2 shows a first embodiment of the present invention, where the stack includes a converter 10, a booster 30, a sonotrode 50, and an anvil 70 that may be used to weld straight patterns. The converter 10 may be comprised of electrical connectors 11, 12, and 13. The converter 10 may also comprise a flat surface 15 from which protrudes a cylindrical connection means 16 that may be received in a corresponding cylindrical opening 31 in flat surface 32 of booster 30, for attachment of the converter to the booster. The booster 30 may have a flange 33 for use in securing the booster to a press. The booster may have a second flat surface 35 with a cylindrical opening 36 therein, to receive a corresponding cylindrical protrusion 51 of the horn 50. Alternatively, the booster may have a cylindrical protrusion that is received by a cylindrical recess 51A, as seen for the alternative sonotrode 50A of FIG. 10A. The cylindrical protrusion 51 of the horn 50 may protrude from a rectangular block, having a length 53, a width 54, and a depth 55. The rectangular block may transition, at the depth 55, into a narrow rectangular block having a width 58, and being of sufficient length 59, inclusive of the filleted transition areas 52, to create a horn of total length 57. The horn 50 may have a contact surface 56 with a width 58 and length 53 designed for contact with anvil 70.

The anvil 70, which may be seen in FIGS. 3-9, is configured to be supported in a fixture and be engaged by the surface 56 of sonotrode 50. Anvil 70 may be comprised of a mounting platform 71 having a width 72, length 73, and depth 74. The mounting platform 71 may be used to retain the anvil 70 in the mounting fixture. Protruding away from the mounting platform 71 may be a pedestal portion 75 that shares the same width 72 as the mounting platform, but may have a length 76 that may be shorter than, and be approximately centered upon, the length 73 of the mounting platform 71. The pedestal 75 may narrow, by a pair of radiused surfaces 77, into the engagement surface 78.

As seen in the enlarged detail of the engagement surface 78 in FIGS. 7 and 8, and the section cut of FIG. 9, the engagement surface 78 of the anvil 70 comprises a specially constructed interface that is designed for receiving the vibrations emitted by the sonotrode 50 to create a narrower ultrasonic weld region which provides greater weld strength than is created by two flat continuous engagement surfaces. The engagement surface 78 comprises a plurality of specially crafted energy directors 79, but are not energy directors in the plain meaning as utilized within the relevant art. An energy director within the prior art is where the work pieces themselves—meaning the parts to be ultrasonically welded—are created such that one part is flat and the other part comes to a sharp point (FIG. 12). In the case of the prior art energy director, with an example being shown by U.S. Pat. No. 6,066,216 to Ruppel, the pointed work piece was to provide a focal point for vibrations to produce frictional heat, and thereby provide a specific volume of melted material to joint the two parts (FIG. 12A). With the invention herein, the anvil and sonotrode may comprise a plurality of specially constructed energy directors 79 that may be arranged into a coordinated three-dimensional grid pattern, being coordinated between the sonotrode and anvil, to thereby selectively increase the total surface area of the anvil that may be capable of distributing vibrations in a three-dimensional contact pattern of vibration-transmissive contact with the sonotrode, and which may also cause a minimal amount of deformation of the work pieces during the initial horn-to-anvil engagement (FIG. 11). The deformation may preferably be limited to a slight amount, and therefore be limited to remain within the elastic range of the material. The increase in surface area of contact may depend upon the width of the plateau surfaces used, as described hereinafter. The three-dimensional contact pattern may be ascertained by reference to FIG. 8, and FIGS. 9 and 10.

The energy directors 79 of the anvil 70 may be regularly spaced apart from each other, as seen in FIG. 8. The energy directors 79 may preferably be spaced apart in a first direction that may parallel the weld line, and be similarly spaced apart in a second direction away from, or orthogonal to, the weld line to form the grid pattern. In a first embodiment, each of the energy directors 79 may comprise a plateau surface 80 that may be formed by a first angled side surface 81, a second angled side surface 82, a third angled side surface 83, and a fourth angled side surface 84, where the plateau surfaces 80 may comprise a rectangular-shape that may be oriented at a 45 degree angle to the weld line. At the meeting of adjacent side surfaces 81 and 82 of adjacent plateau surfaces 80, there may be a valley bottom or trough line 87 that may be oriented at a minus 45 degree angle with respect to the weld line, and at the meeting of the adjacent side surfaces 83 and 84 of adjacent plateau surface 80, there may be a trough line 88 that may be oriented at a plus 45 degree angle with respect to the weld line.

Figure 9A:
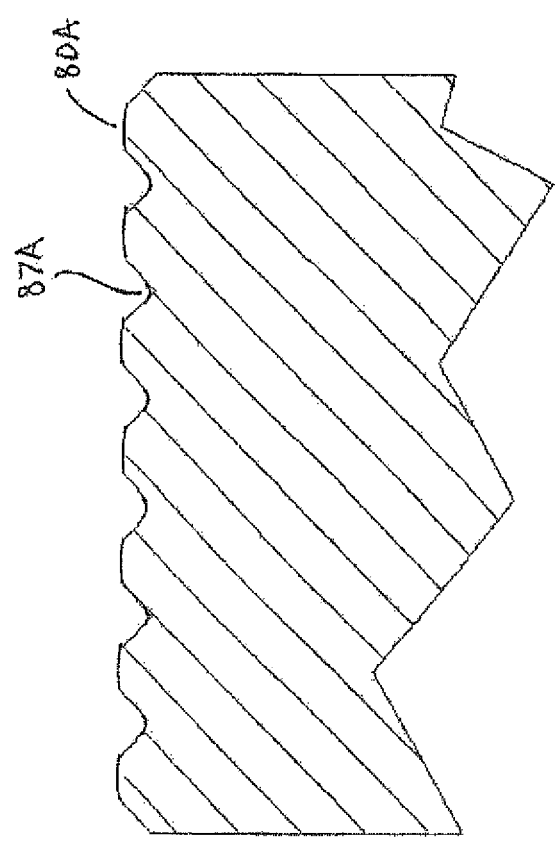
FIG. 9A a section cut through an alternative embodiment of the anvil of the present invention.
Figure 9B:
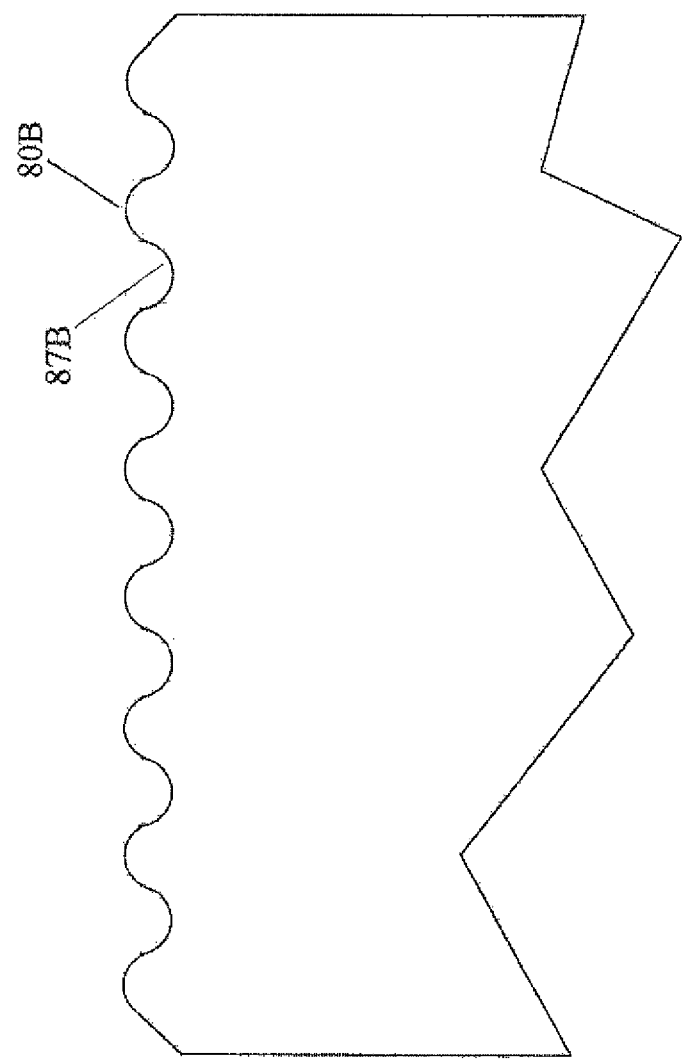
FIG. 9B is the section cut of FIG. 9a, but showing the radius of curvature of the contoured plateau surfaces and the radius of curvature of the filleted troughs being formed of equal sizes, and being formed to be co-tangent with an adjacent surface to form a sinusoidal shape.

The rectangular-shaped plateau surface 80 lends itself very well to two different types of repetitive patterned engagement with the sonotrode described hereinafter; however, other geometric plateau shapes may also be utilized, which would naturally alter the side-surface arrangement. Also, the rectangular-shaped plateau surfaces 80 may each be generally flat, although contoured plateau surfaces 80A may alternatively be utilized, along with a filleted or radiused trough 87A, as seen in FIG. 9A. FIG. 9B shows the same geometric plateau shape as FIG. 9A, except that it shows the particular instance where the radius of curvature of the contoured plateau surfaces 80B and the radius of curvature of the filleted troughs 87B are formed of equal sizes, and are formed to be co-tangent with an adjacent surface to form a sinusoidal shape.

In a first embodiment, seen in FIG. 9, the energy directors 79 of the anvil 70 may have a span therebetween of approximately 0.020 inches, and have a depth from the plateau surface 80 to the troughs 87 or 88 of approximately 0.006 inches. The angled side surfaces may each be at an angle $\Theta$, that may be different for various configurations, but in the first embodiment, angled side surfaces 81, 82, 83, and 84 may be oriented such that the angle $\Theta$ is a 45 degree angle, which, when resolved geometrically, would result in the width of the plateau surfaces 80 being 0.008 inches. Since the dimensions of the energy directors 79 may not necessarily be very large with respect to the material thicknesses being welded, the amount of deformation, discussed earlier, may similarly not be very large, and thus does not pose an issue as to tearing of the material of the work pieces, or even necessarily, issues relating to plastic deformation.

The sonotrode 50 may have corresponding energy directors, as seen in FIGS. 10A-10E, and may similarly include plateau surfaces 60, as well as side surfaces 61, 62, 63, and 64. The improved sonotrode 50 and anvil 70 may be constructed to have engagement therebetween of energy directors comprising a greater surface area of contact between corresponding plateau surfaces and valleys, than the traditional flat surfaced sonotrode contacting a flat surfaced anvil. This increased surface area of contact, which may be seen from the engagement of the sonotrode and anvil with the work-pieces in FIG. 11 to cause minor elastic deformation prior to application of ultrasonic vibrations, results in more durable ultrasonic welding of two work pieces.

Figure 11A:
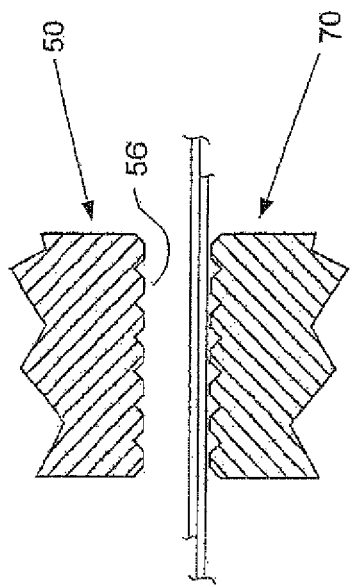
FIG. 11A is a section cut through the anvil and sonotrode of the current invention, shown prior to engaging work pieces, where the engagement of sonotrode energy director plateaus are aligned with and butt against corresponding anvil energy directors plateaus.
Figure 11B:
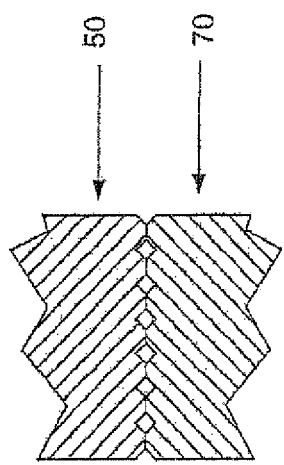
FIG. 11B shows alignment of the energy director plateaus of the sonotrode with those of the anvil, per the arrangement of FIG. 11A.
Figure 11C:
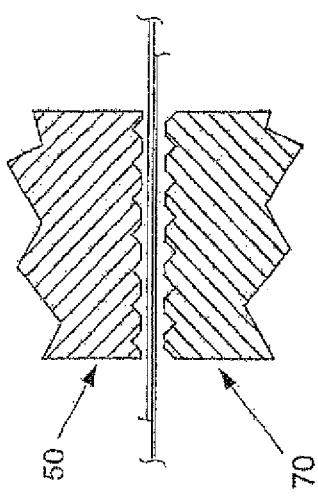
FIG. 11C is a section cut through the anvil and sonotrode of the current invention, shown prior to engaging work pieces, where the engagement of sonotrode energy director plateaus are aligned to interlock with the anvil energy directors plateaus.
Figure 11D:
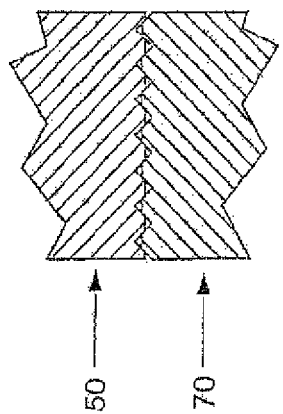
FIG. 11D shows the interlocking alignment of the energy director plateaus of the sonotrode with those of the anvil, per the arrangement of FIG. 11C.
Figure 12A:
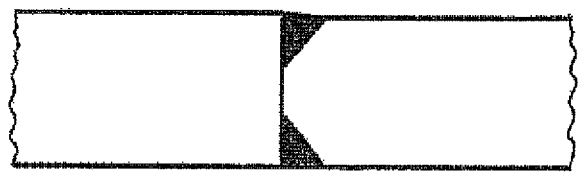
FIG. 12A shows the prior art energy director of FIG. 12 after ultrasonic welding.
Figure 12:
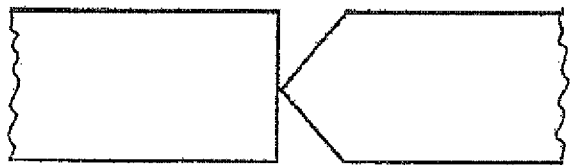
FIG. 12 shows a prior art energy director utilized on work pieces prior to ultrasonic welding.

In one embodiment of welding being accomplished between the sonotrode and anvil of the present invention, alignment of the anvil and sonotrode, which is critical in each case, consists of having the energy director grids aligned so that the plateau surfaces of the sonotrode directly butt against plateau surfaces of the anvil (FIG. 11B). This focuses the vibration energy into a select grid pattern, so that when work pieces are inserted between the sonotrode and anvil (FIG. 11A), ultrasonic welding is achieved more rapidly and efficiently across the entire weld. The butt-surface alignment method is favorably used on thicker work pieces and thinner non-foil applications.

In a second embodiment of welding according to the present invention, which is advantageous for thinner work pieces, dramatically improved weld durability is achieved by utilizing alignment between the energy director grids whereby the side surfaces of the sonotrode plateaus interlock with the side surfaces of the anvil plateaus (FIG. 11D) in a repeating 3-dimensional pattern, which may include minor elastic deformation of the work pieces. When the work pieces are inserted between the sonotrode and anvil (FIG. 11C), a three-dimensional weld results. The three-dimensional weld exhibits significantly improved durability over that of conventional ultrasonic welds. Depending on the length of the plateau surface utilized on both the anvil and sonotrode, the surface area of contact may be greater or less than the surface area of contact for flat engagement surfaces of the prior art welding machines. Even where the surface area of contact is somewhat less than that of the prior art flat engagement surfaces, increased durability of the weld results. However, where a relatively small plateau surface is used, perhaps being somewhat smaller than the one illustrated in FIGS. 9 and 11D, the surface area of contact would be significantly larger, and may therefore serve to further reduce the weld times and may also serve to further improve the weld quality/durability. The limiting case would be where the length of the plateau approaches zero, so that there would essentially be interlocking pyramid shapes, and for the sides being at a 45 degree slope, the result would be an increase in surface area of contact of approximately 41.4 percent (The mathematical formula for the surface area of a pyramid being $\frac{1}{2}\times$Perimeter$\times$[Side Length]$\times$[Base Area]). Another means of describing and/or visualizing the energy director grids of the present invention, as seen in FIGS. 8-9 and 10E, is as a pyramid frustum.

Since the alignment of the anvil and sonotrode in the interlocking alignment method is crucial for achieving the results offered herein, the horn 50E may preferably be designed to include a peripheral flange 65 at roughly the mid-plane of the horn. The flange 65 may permit mounting of the horn in closer proximity to the contact surface 56, rather than relying solely upon the mounting connection with the booster, or booster and converter. The need for this type of flanged horn for help with alignment is very pronounced for welding of very thin materials.

Figure 13:
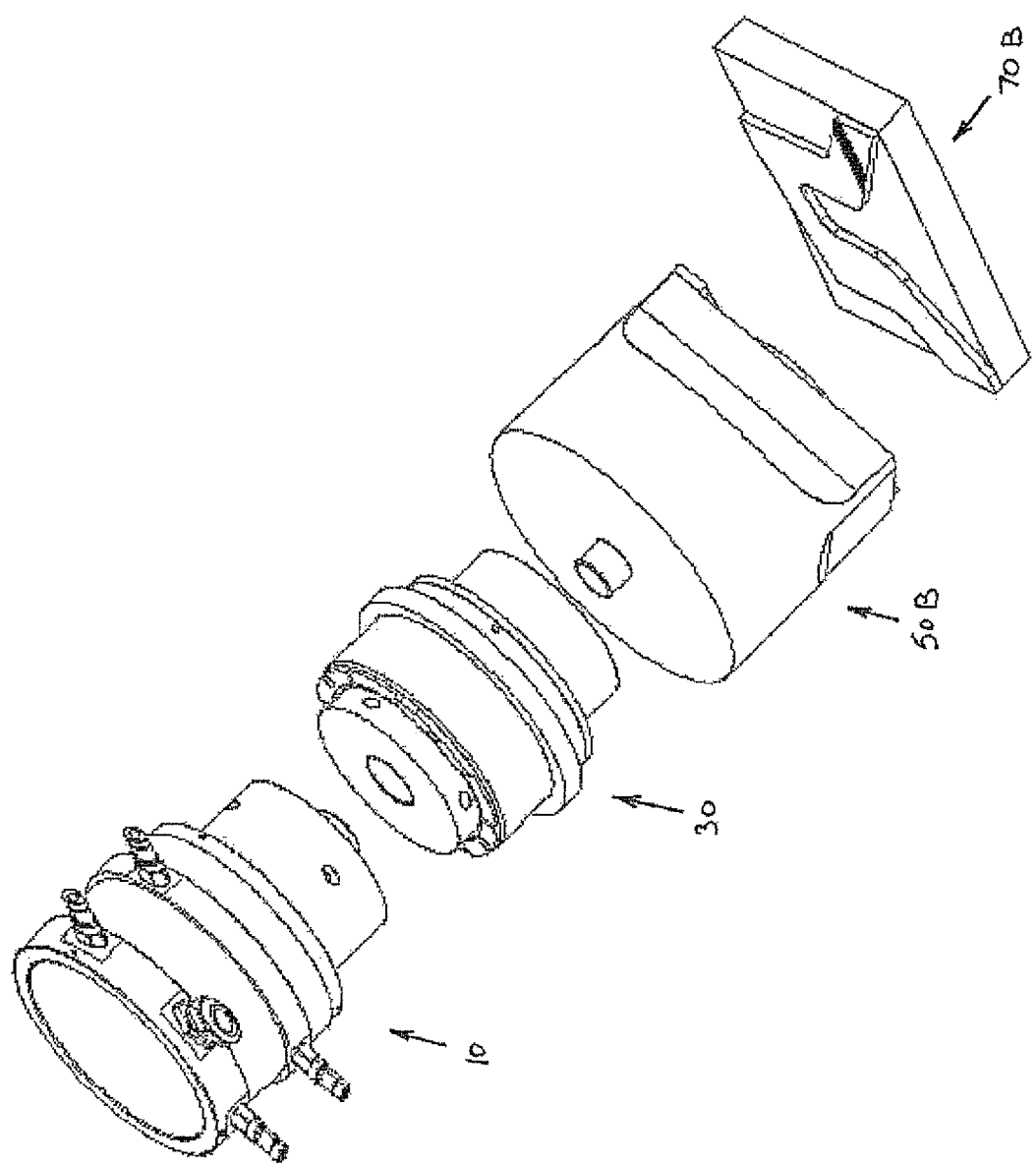
FIG. 13 is an exploded view of a portion of an ultrasonic welding machine comprising a converter, a booster, a sonotrode, and an alternative grid-surfaced anvil that may be used to produce contoured (non-linear) weld patterns.
Figure 14:
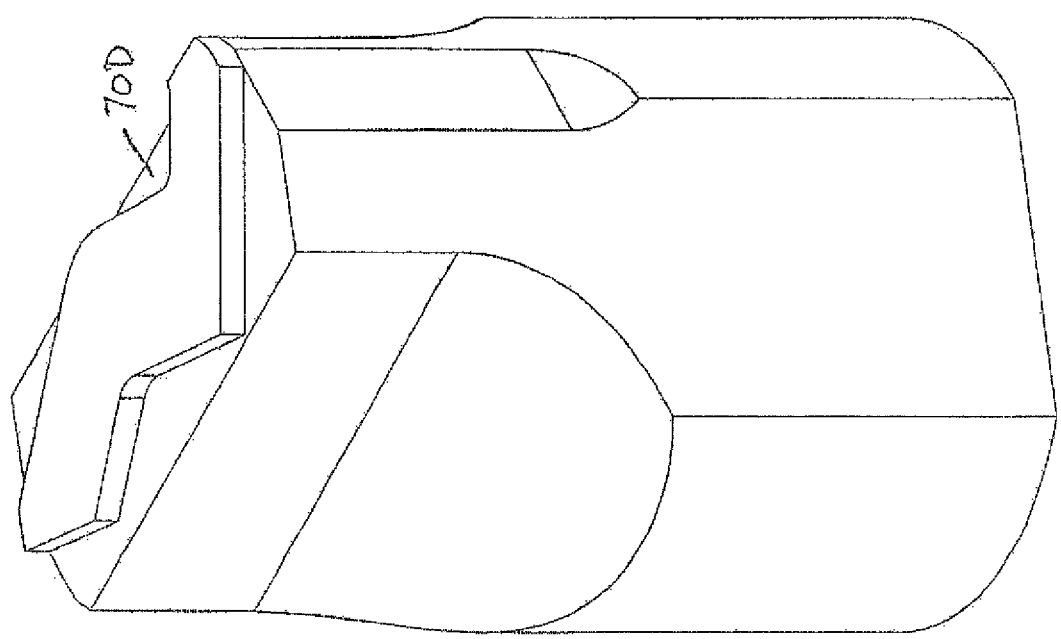
FIG. 14 shows a second alternative grid-surfaced anvil that may be used to produce non-linear weld geometries.

FIG. 13 illustrates the usage of a sonotrode 50B and anvil 70B utilizing the energy directors of the present invention, to create an ultrasonic weld that does not follow a straight-line to create a linear weld in the form of an elongated weld having a rectangular-shaped periphery, and alternatively creates complex, nonlinear weld geometry upon a package to seal the package. FIG. 14 shows anvil 70D, which is capable of being used in the formation of yet another complex curved weld. These non-linear anvil/sonotrode combinations may be utilized to weld materials having a complex irregularly-shaped periphery, rather than the simple linear weld that is typically used, such as for a package of potato chips available at most vending machines. Use of these anvil/horn energy director grid combinations also allows for welding of materials to produce durable 3-dimensional geometries.

Figure 15:
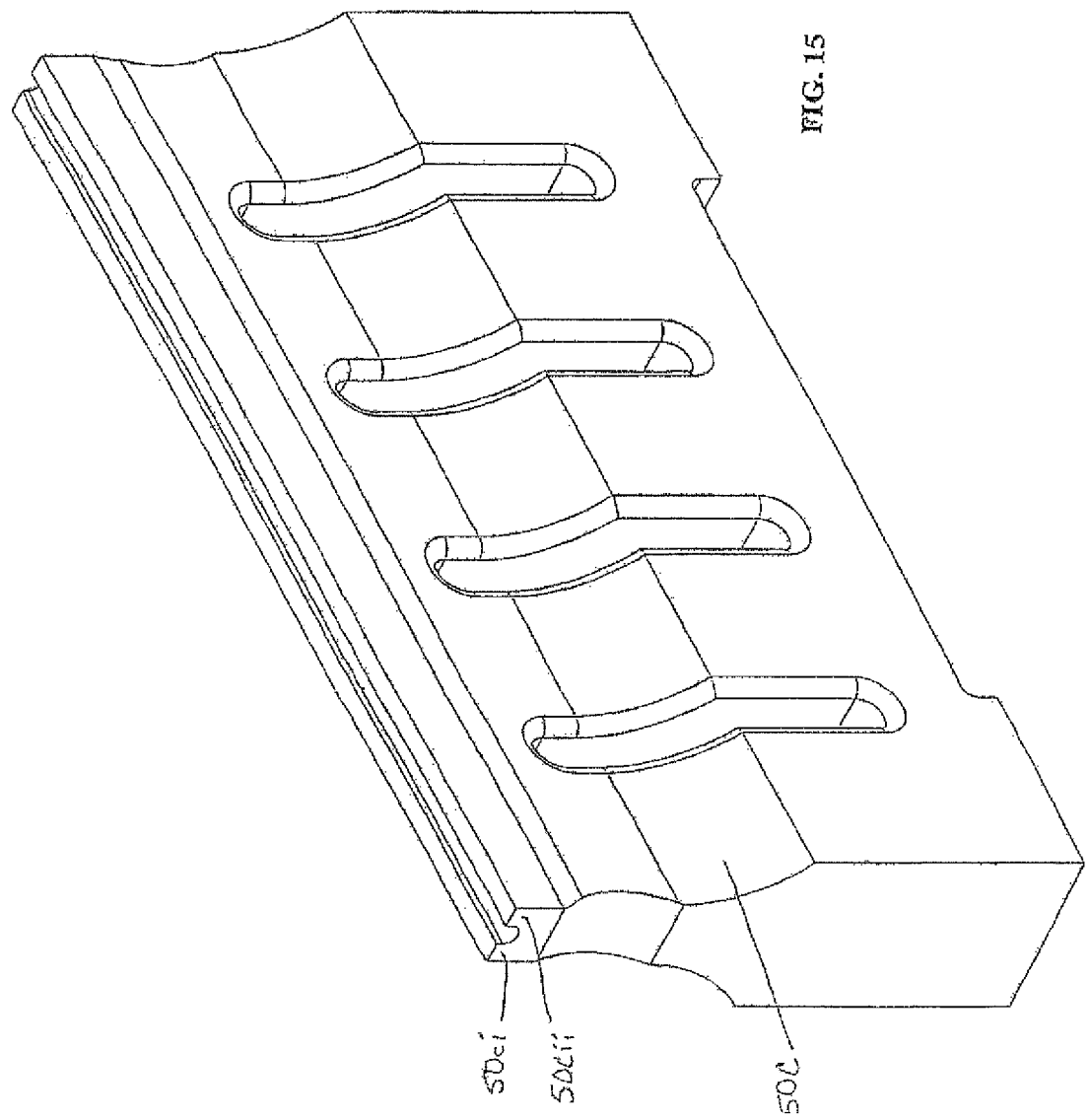
FIG. 15 shows an alternative "dual lane" horn that accomplishes ultrasonic welding and accommodates a blade to cut through the center of the welded materials after welding in completed.

Lastly, FIG. 15 shows an alternative "dual lane" horn 50C, having a first lane 50Ci and a second lane 50Cii. The dual lane horn 50C accomplishes ultrasonic welding according to the present invention, and also accommodates a blade, which may cut through the center of the welded materials along the weld line, after welding is completed, with the blade being able to bottom-out in the valley between the lanes.

Figure 16A:
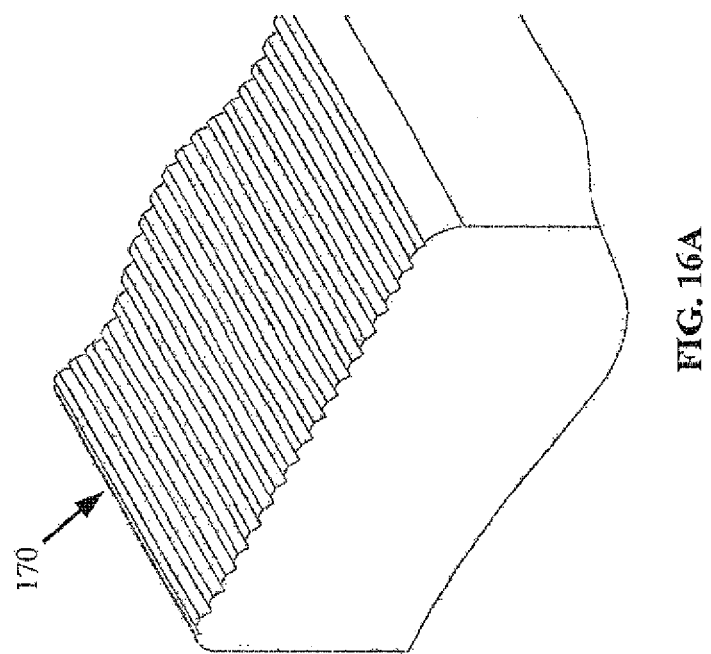
FIG. 16A shows the embodiment of FIG. 7, but where the energy directors are spaced to only form a three-dimensional pattern in a first direction.
Figure 16B:
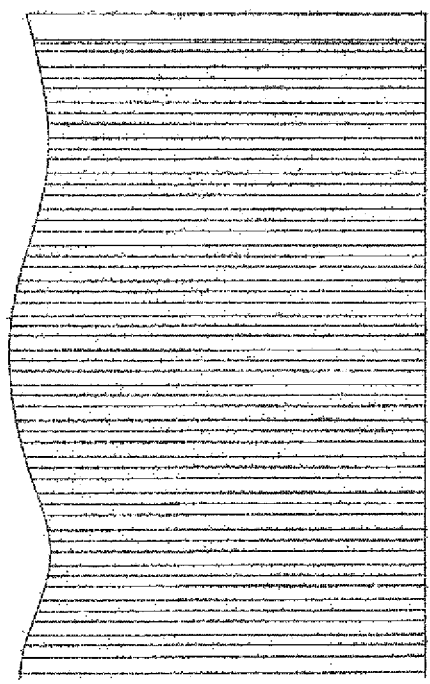
FIG. 16B is a top view of the embodiment of FIG. 16A.
Figure 16C:
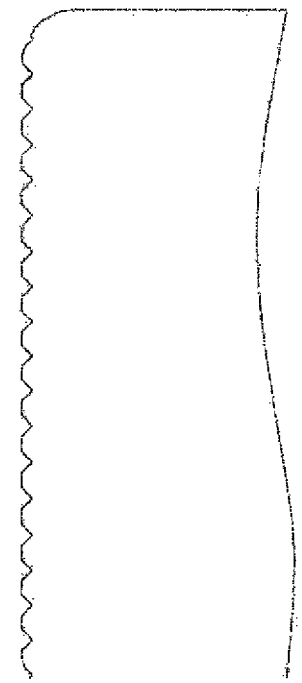
FIG. 16C is a cross-sectional view of the embodiment of FIG. 16A.

FIG. 16A shows the embodiment presented in FIG. 7, but where the energy directors are spaced to form a three-dimensional pattern in only a first direction for a horn/anvil 170. With the energy directors being elongated and spaced only in the first direction, engagement between the anvil and sonotrode would similarly occur, but would be between the pairs of adjacent surfaces—i.e., between two sides of each energy director of the horn with those of the anvil, instead of between each of the four sides of the energy directors shown in FIG. 7.

Figure 17A:
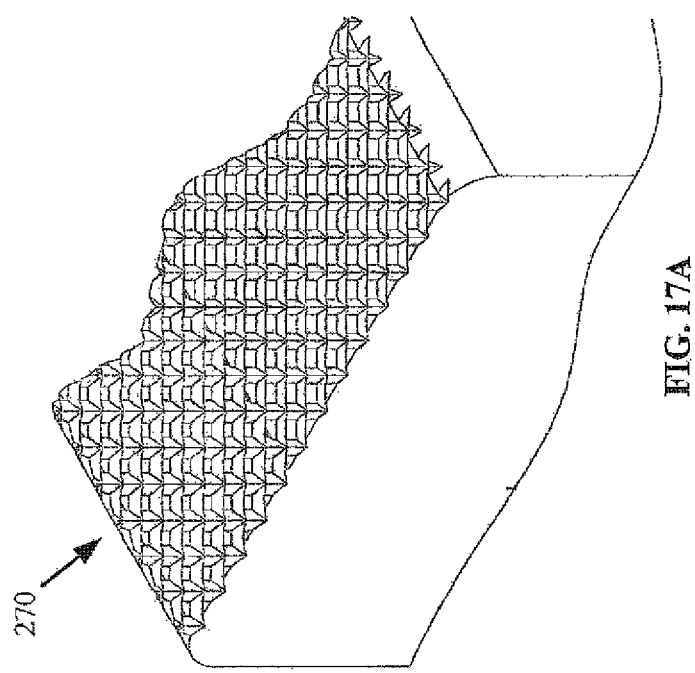
FIG. 17A shows the embodiment of FIG. 7, but with a step formed in the plateau surfaces.
Figure 17B:
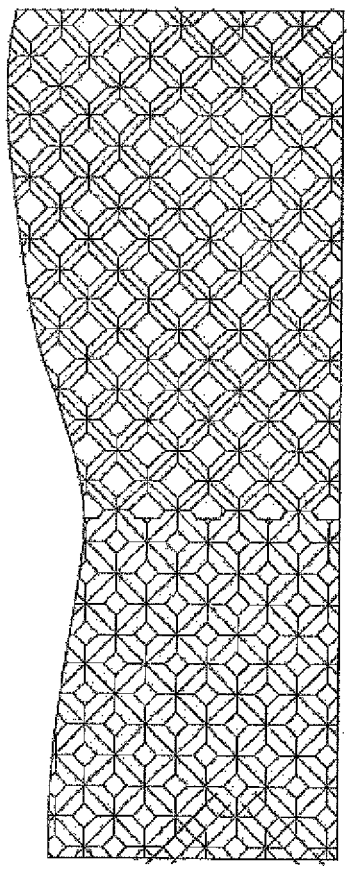
FIG. 17B is a top view of the embodiment of FIG. 17A.
Figure 17C:
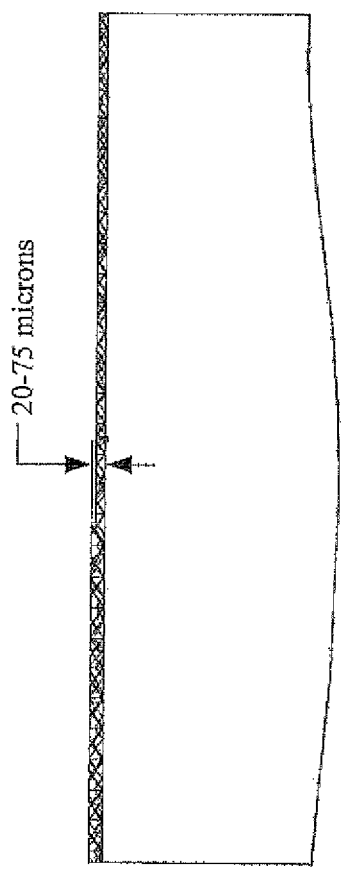
FIG. 17C is a cross-sectional view of the embodiment of FIG. 17A.
Figure 18A:
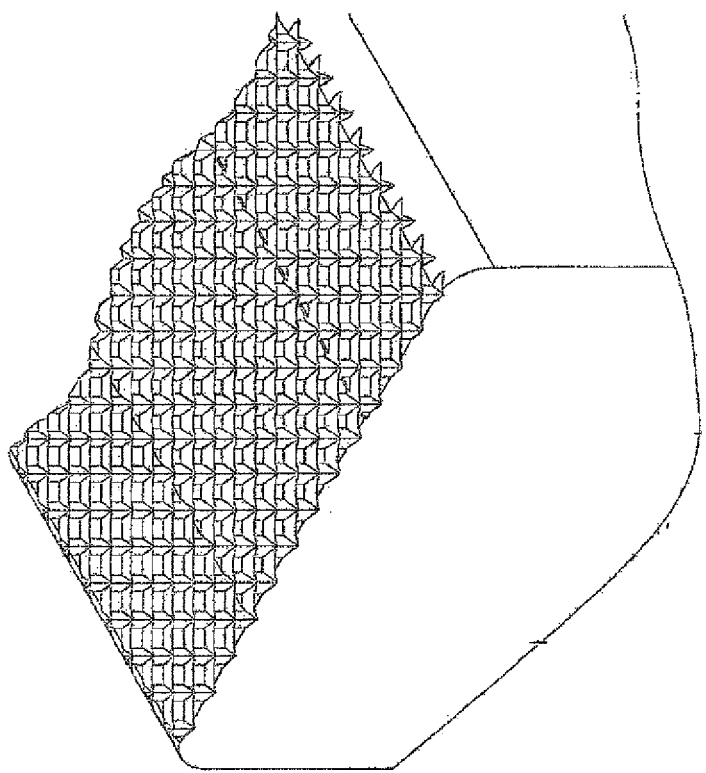
FIG. 18A shows the embodiment of FIG. 7, but with two steps formed in the plateau surfaces.
Figure 18B:
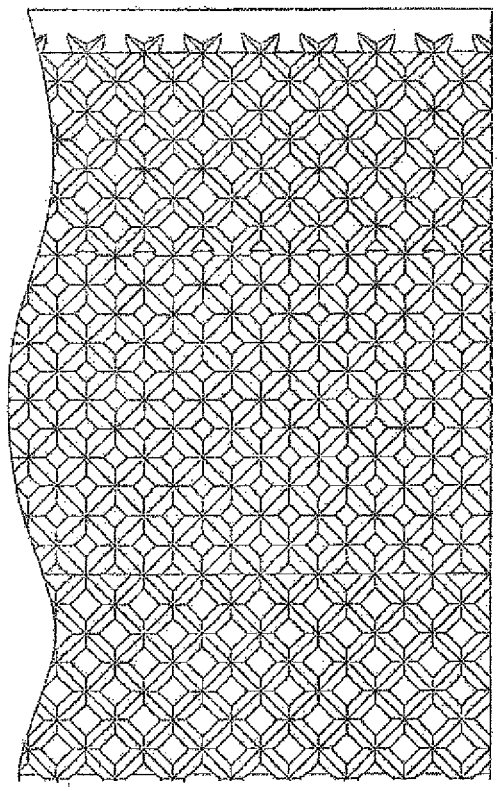
FIG. 18B is a top view of the embodiment of FIG. 18A.
Figure 18C:
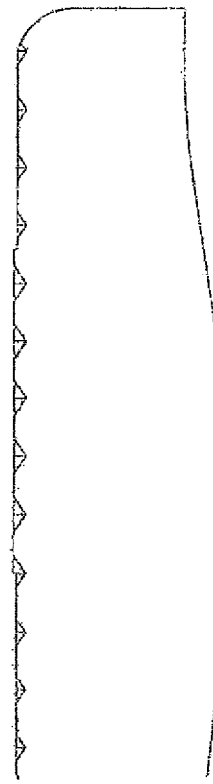
FIG. 18C is a cross-sectional view of the embodiment of FIG. 18A.

FIGS. 17A-17C show the embodiment presented in FIG. 7, but where a step is formed in the energy directors for a horn/anvil 270—a step that may be linear or may be curved. As seen in FIG. 17C, the height of the step may preferably be between 20 microns and 125 microns, and may more preferably be between 45 microns and 105 microns, and in a most preferred embodiment may be between 70 microns and 80 microns. This step is more easily seen in FIG. 17B, despite its shallowness, because of the visual effect produced with the increasing dimensions of the plateau surfaces for the shallower energy directors versus the dimensions of the plateau surfaces of the taller energy directors. The step may be formed in any direction, and depending upon the extent and spacing of the plateau surfaces, the step may occur completely between adjacent plateau surfaces. The step is shown in FIG. 17B occurring across a line of the plateau surfaces, rather than between two adjacent lines of plateau surfaces, to better emphasize the transition therebetween.

The step serves to reduce the degree of interlock in a small region of the seal, formed by the corresponding regions of the horn/anvil combination, which is intended to mimic the results of other conventional sealing systems. For example, it is common to use conventional ultrasonic sealing of the top of a pouch, but to thereafter use a heat sealing step to seal the pouch all the way up past the top edge. This is done so that there is no room for product to stay in the opening above the seal. The initial seal is referred to as a barrier seal, and the follow up heat seal is referred to as a cosmetic seal. The stepped embodiment for horn/anvil 270 shown in FIGS. 17A-17C can accomplish both the barrier seal and the cosmetic seal in a one-step operation. Although the shallower energy directors formed by the step do not create a weld of the same integrity as the energy directors of full height, the step is sized so that they nonetheless produce a weld that is sufficient to keep the layers together. The area of the cosmetic seal may be reduced, in order to reduce the amount of clamp force needed, as well as to reduce the amount of weld time needed to keep up with machine speeds. This combination of barrier and cosmetic seals in one step allows for a faster throughput with less stations on the FFS machinery.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

We claim:

1. A horn and anvil combination, said horn and anvil combination configured for use in ultrasonic welding of thin work pieces, for improved integrity in the packaging of solids and liquids with narrow welds:

said horn comprising:
  a plurality of energy directors being spaced in a first direction and in a second direction to form a pattern, each of said plurality of energy directors comprising a shaped plateau surface with each side of said shaped plateau surface configured to transition into an angled side surface; each said angled side surface of each said plateau surface being connected with another side surface of an adjacent plateau surface, except at an outer periphery of said horn;

said anvil comprising:
  a plurality of energy directors being spaced in a first direction and in a second direction to form a pattern, each of said plurality of energy directors comprising a shaped plateau surface with each side of said shaped plateau surface configured to transition into an angled side surface; each said angled side surface of each said plateau surface being connected with another side surface of an adjacent plateau surface, except at an outer periphery of said anvil;
  and wherein said energy directors of said horn and said energy directors of said anvil are configured for alignment, whereby said side surfaces of said horn plateaus interlock with said side surfaces of said anvil plateaus in a pattern, in both said first direction and said second direction.

2. The horn and anvil combination according to claim 1 wherein said shaped plateau surface for each of said horn and anvil comprises a rectangular-shaped plateau surface having a first, a second, a third, and a fourth angled side surface; and wherein, for each of said horn and said anvil, each of said angled side surfaces of each said plateau surface are connected with another side surface of said adjacent plateau surface to folio a respective trough line therebetween.

3. The horn and anvil combination according to claim 2 wherein, for each of said horn and said anvil, each of said plateau surfaces are substantially coplanar, and each of said trough lines are substantially coplanar; and wherein each of said plateau surfaces are formed to be substantially at the same distance from said substantially planar trough lines.

4. The horn and anvil combination according to claim 2
wherein for a first region respectively on each of said horn and said anvil, said plateau surfaces are substantially coplanar, and each of said respective trough lines in said first region are substantially coplanar, with each of said plateau surfaces in said first region formed to be substantially at a first distance away from said substantially planar trough lines; and wherein for a second region respectively on each of said horn and said anvil, said plateau surfaces are substantially coplanar, and each of said respective trough lines in said second region are substantially coplanar with each other, and substantially coplanar with said trough lines of said first region, with each of said plateau surfaces in said second region formed to be substantially at a second distance away from said substantially planar trough lines, said second distance being smaller than said first distance.

5. The horn and anvil combination according to claim 4,
wherein said second direction on said horn is orthogonal to said first direction on said horn, with said plurality of energy directors of said horn being regularly spaced in said first horn direction and regularly spaced in said second horn direction to form a grid pattern thereon; and wherein said second direction on said anvil is orthogonal to said first direction on said anvil, with said plurality of energy directors of said anvil being regularly spaced in said first anvil direction and regularly spaced in said second anvil direction to form a grid pattern thereon.

6. The horn and anvil combination according to claim 5 wherein, for each of said horn and said anvil, said first region and said second region transition to form a substantially linear step.

7. The horn and anvil combination according to claim 6 wherein said interlocking energy directors of said horn and said anvil are configured to increase a total surface area of contact between said horn and said anvil, and are thereby configured to transmit vibrations.

8. The horn and anvil combination according to claim 7 wherein said angled side surfaces for each said plateau surface is at an angle of 45 degrees to said plateau surface.

9. The horn and anvil combination according to claim 8 further comprising a peripheral flange positioned proximate to a mid-plane of said horn to be configured to provide support for said horn for said alignment.

10. The horn and anvil combination according to claim 9 wherein each said rectangular-shaped plateau surfaces are oriented to have each said side be at a 45 degree angle to a length-wise direction of said horn and anvil combination.

11. The horn and anvil combination according to claim 10 wherein said rectangular-shaped plateau surfaces of each of said horn and said anvil comprise a square-shaped surface.

12. A sonotrode and anvil combination, for use on a form-fill-seal machine for ultrasonic welding of thin work pieces:
    said sonotrode comprising:
        a plurality of energy directors being spaced in a first direction and in a second direction to form a pattern, each of said plurality of energy directors comprising a shaped plateau surface with each side of said shaped plateau surface configured to transition into an angled side surface; each said angled side surface of each said plateau surface being connected with another side surface of an adjacent plateau surface, except at an outer periphery of said sonotrode;
    said anvil comprising:
        a plurality of energy directors being spaced in a first direction and in a second direction to form a pattern, each of said plurality of energy directors comprising a shaped plateau surface with each side of said shaped plateau surface configured to transition into an angled side surface; each said angled side surface of each said plateau surface being connected with another side surface of an adjacent plateau surface, except at an outer periphery of said anvil;
        and
    wherein said energy directors of said sonotrode and said energy directors of said anvil are configured for alignment, whereby said side surfaces of said sonotrode plateaus interlock with said side surfaces of said anvil plateaus in a pattern, in both said first direction and said second direction.

13. The horn and anvil combination according to claim 12 wherein said shaped plateau surface for each of said horn and anvil comprises a rectangular-shaped plateau surface having a first, a second, a third, and a fourth angled side surface; and wherein, for each of said horn and said anvil, each of said angled side surfaces of each said plateau surface are connected with another side surface of said adjacent plateau surface to form a respective trough line therebetween.

14. The horn and anvil combination according to claim 13 wherein, for each of said horn and said anvil, each of said plateau surfaces are substantially coplanar, and each of said trough lines are substantially coplanar; and wherein each of said plateau surfaces are formed to be substantially at the same distance from said substantially planar trough lines.

15. The horn and anvil combination according to claim 13 
    wherein for a first region respectively on each of said horn and said anvil, said plateau surfaces are substantially coplanar, and each of said respective trough lines in said first region are substantially coplanar, with each of said plateau surfaces in said first region formed to be substantially at a first distance away from said substantially planar trough lines; and
    wherein for a second region respectively on each of said horn and said anvil, said plateau surfaces are substantially coplanar, and each of said respective trough lines in said second region are substantially coplanar with each other, and substantially coplanar with said trough lines of said first region, with each of said plateau surfaces in said second region formed to be substantially at a second distance away from said substantially planar trough lines, said second distance being smaller than said first distance.

16. The horn and anvil combination according to claim 15, 
    wherein said second direction on said horn is orthogonal to said first direction on said horn, with said plurality of energy directors of said horn being regularly spaced in said first horn direction and regularly spaced in said second horn direction to form a grid pattern thereon; and
    wherein said second direction on said anvil is orthogonal to said first direction on said anvil, with said plurality of energy directors of said anvil being regularly spaced in said first anvil direction and regularly spaced in said second anvil direction to form a grid pattern thereon.

17. The horn and anvil combination according to claim 16 wherein, for each of said horn and said anvil, said first region and said second region transition to form a substantially linear step.

18. The horn and anvil combination according to claim 16 wherein said interlocking energy directors of said horn and said anvil are configured to increase a total surface area of contact between said horn and said anvil, and are thereby configured to transmit vibrations.

19. The horn and anvil combination according to claim 16 wherein said angled side surfaces for each said plateau surface is at an angle of 45 degrees to said plateau surface.

20. The horn and anvil combination according to claim 16 further comprising a peripheral flange positioned proximate to a mid-plane of said horn to be configured to provide support for said horn for said alignment.

21. The horn and anvil combination according to claim 16 wherein each said rectangular-shaped plateau surfaces are oriented to have each said side be at a 45 degree angle to a length-wise direction of said horn and anvil combination.

22. The horn and anvil combination according to claim 16 wherein said rectangular-shaped plateau surfaces of each of said horn and said anvil comprise a square-shaped surface.

* * * * *